United States Patent [19]

Stiefel

[11] 4,112,262
[45] Sep. 5, 1978

[54] TELEPHONE STATION REPEATER

[75] Inventor: Kenneth Erwin Stiefel, Randolph Township, Morris County, N.J.

[73] Assignee: Bell Telephone Laboratories, Incorporated, Murray Hill, N.J.

[21] Appl. No.: 819,059

[22] Filed: Jul. 26, 1977

[51] Int. Cl.² .......................... H04B 3/18; H04B 3/36
[52] U.S. Cl. ................................. 179/170 G; 179/81 B
[58] Field of Search .................... 330/61 A; 333/80 R, 333/80 T; 179/170 G, 81 B, 170 R

[56] References Cited

U.S. PATENT DOCUMENTS

| | | | |
|---|---|---|---|
| 2,878,325 | 3/1959 | Merrill, Jr. | 179/170 G |
| 3,141,138 | 7/1964 | Oshima et al. | 330/61 A |
| 3,384,844 | 5/1968 | Meacham | 333/80 R |
| 3,503,002 | 3/1970 | Valfre | 330/61 A |
| 3,521,181 | 7/1970 | Bitzer | 330/61 R |
| 3,551,838 | 12/1970 | Valfre | 330/61 A |
| 3,872,258 | 3/1975 | Chambers | 179/16 F |
| 3,927,280 | 12/1975 | Gupta et al. | 179/170 G |
| 3,963,876 | 6/1976 | Holtz et al. | 179/81 B |
| 4,056,688 | 11/1977 | Stiefel | 179/170 G |

Primary Examiner—Kathleen H. Claffy
Assistant Examiner—Randall P. Myers
Attorney, Agent, or Firm—Robert O. Nimtz

[57] ABSTRACT

A telephone station repeater is disclosed which will provide bidirectional gain in a long telephone loop at the customer's station. The repeater is powered from the central office battery over the loop and provides gain with very small power consumption and virtually no power consumption when not in use.

The station repeater comprises a negative impedance amplifier including a shunt negative impedance, a series negative impedance and an autotransformer connected in a $\pi$ configuration. The shunt converter is disconnected when the telephone set is on-hook. The autotransformer provides impedance matching to the telephone set.

9 Claims, 1 Drawing Figure

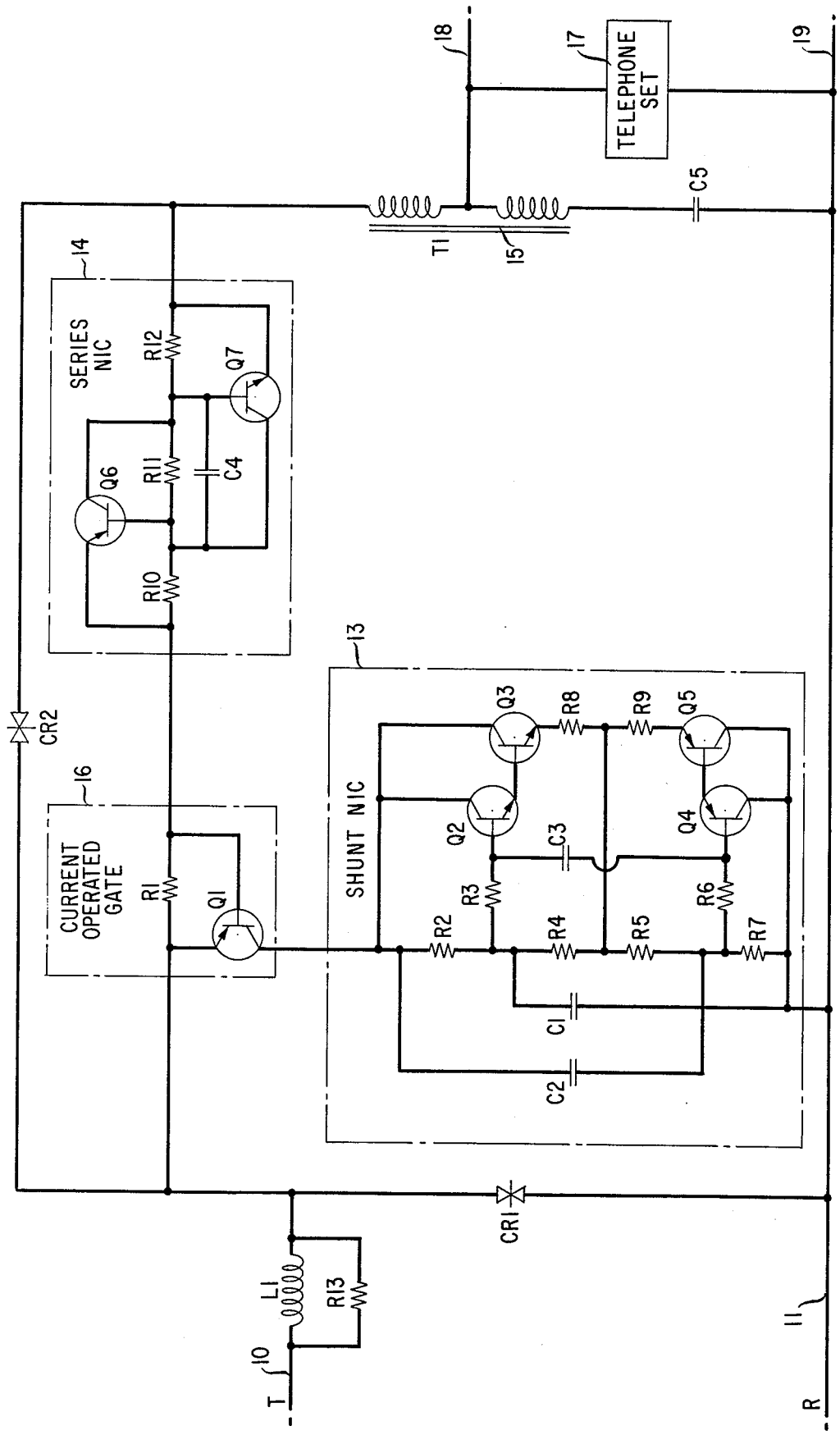

TELEPHONE STATION REPEATER

BACKGROUND OF THE INVENTION

1. Field of the Invention

This invention relates to negative impedance bilateral amplifiers and, more particularly, to telephone station repeaters utilizing such amplifiers.

2. Description of the Prior Art

On long telephone loops (exceeding approximately 2800 ohms) it is necessary to provide voice frequency gain at or near the customer end of the telephone loop. Heretofore, this added gain has been supplied by an amplifier contained in the subscriber's telephone handset. One such arrangement is shown in R. E. Holtz et al U.S. Pat. No. 3,963,876, granted June 15, 1976. While this arrangement provides the necessary gain, it requires a relatively expensive amplifier for each extension telephone connected to the same telephone line. Moreover, the amplifier must be sufficiently miniaturized to fit into a telephone handset. Finally, the handset amplifier arrangement introduces a nonstandard telephone set. Such nonstandard items increase the cost of administering the telephone system.

Negative impedance amplifiers are also known which can be inserted in such long telephone loops to provide the needed gain. In order to provide the required impedance-matching to the telephone set, as well as to the long telephone loop, such negative impedance amplifiers have matching circuits utilizing one or more transformers to provide such impedance matching. Moreover, prior designs for such negative impedance amplifiers draw considerable amounts of current from the telephone loop or have to be powered independent of the telephone loop. Due to the small percentage of time during which such amplifier's are actually in use, such power drains place a burden on the operation of the telephone system. Independently powered amplifiers suffer performance loss during power outages.

In addition to the above constraints, it is desirable that a remotely located telephone station repeater require no manual adjustments, be relatively transparent to telephone signaling currents, permit standard line testing, and be susceptible to manufacture at a reasonable cost.

SUMMARY OF THE INVENTION

In accordance with the illustrative embodiment of the present invention, a telephone station repeater is provided including a shunt negative impedance converter connected across the line only when the telephone set is off-hook, a series negative impedance converter providing a low impedance to signaling voltages, and a shunt autotransformer providing a reasonable impedance match to the telephone set. These three components are connected in a $\pi$ configuration with the shunt negative impedance converter facing the long telephone loop and the autotransformer facing the telephone set.

In accordance with one feature of the present invention, a current-operated gate connects the shunt negative impedance converter across the telephone loop only when the telephone set is off-hook and drawing current from the central office battery. The station repeater is powered entirely from the central office battery and draws a minimum amount of current from the battery when in use.

In accordance with other features of the present invention, ringing and dial pulsing can be accomplished through the station repeater with negligible distortion. The repeater is stable for all existing telephone loops and provides adequate gain throughout the voice frequency band.

BRIEF DESCRIPTION OF THE DRAWING

The single FIGURE of the drawing discloses a detailed circuit diagram of a telephone station repeater in accordance with the present invention.

DETAILED DESCRIPTION

In the drawing, the tip conductor 10 and ring conductor 11 represent a telephone pair at the remote end of a long subscriber loop. The balance of the circuitry of the drawing, except for the telephone set itself, is designed to be mounted at the customer's premises at or near a protector block. Ideally, it is mounted outside of the customer's premises for easy access by maintenance personnel.

The repeater itself comprises a shunt negative impedance converter 13, a series negative impedance converter 14, and an autotransformer 15, all connected in a $\pi$ configuration. Shunt converter 13 is connected between conductors 10 and 11 only in response to a current-operated gate 16 which detects the off-hook current flowing in the telephone loop. The telephone set 17 is connected across the output side of autotransformer 15 which is in series with capacitor C5. As indicated by extended lines 18 and 19, further telephone extensions can be connected across the output of autotransformer 15 and all of these extensions may take advantage of the gain afforded by the station repeater.

The current operated gate 16 comprises a resistor R1 in series with the tip conductor 10 and a transistor Q1 having its base-emitter circuit connected across resistor R1. When telephone set 17 goes off-hook, the current drawn by the telephone set and flowing through resistor R1 is sufficient to bias transistor Q1 into its conductive state and thereby connect shunt negative impedance converter 13 between tip conductor 10 and ring conductor 11. When telephone set 17 is on-hook, on the other hand, insufficient current flows through resistor R1 to operate transistor Q1. This current flow is insufficient, even in the presence of ringing signals, to operate gate 16. Negative impedance converter 13 will therefore remain disconnected from the circuit until voice frequency gain is actually required, as indicated by the telephone set 17 going off-hook.

The shunt negative impedance converter 13 operates to change the positive resistance value of resistors R8 and R9 into a negative value of approximately 2140 ohms which is shunted across the central office conductors 10 and 11. Resistors R2, R4, R5, and R7 serve to provide appropriate biasing levels for transistors Q2, Q3, Q4, and Q5. A frequency shaping network comprising resistors R3 and R6 and capacitor C3 serve to reduce the negative admittance of the negative impedance converter as frequency is increased. This insures that the converter 13 is stable without oscillations outside of the voice frequency band and that the transition from the negative impedance characteristic into a positive impedance takes place in a gradual and controlled manner. Capacitors C1 and C2 provide positive feedback from the collectors of transistors Q3 and Q5, respectively, to the base networks of transistors Q2 and Q4. This feedback directly causes the impedance inversion of resistors R8 and R9. Transistor Q2 drives transistor Q3 while transistor Q4 drives transistor Q5. The resulting negative impedance seen between the terminals of shunt negative impedance converter 13 is approximately 2140 ohms. This permits an overall gain for the amplifier of the drawing of about 4 dB.

The series negative impedance converter 14 is similar to those described in L. A. Meacham U.S. Pat. No. 3,384,844, granted May 21, 1968. Resistor R11 and capacitor C4, connected in parallel between the bases of transistors Q6 and Q7, are converted into a negative impedance of approximately 490 ohms when viewed from the external terminals of converter 14. Resistor R10, connected between the base and emitter of transistor Q6, and resistor R12, connected between the base and emitter of transistor Q7, provide voltage biases for the transistor electrodes. The base of transistor Q6 is connected to the collector of transistor Q7 and, similarly, the base of transistor Q7 is connected to the collector of transistor Q6.

In this configuration, negative impedance converter 14 provides a reasonably linear region of negative impedance for a range of terminal voltages and currents. When the handset in telephone set 17 is on-hook, insufficient current flows through resistors R10, R11, and R12 to bias transistors Q6 and Q7 into their operating region and circuit 14 remains a positive impedance.

When telephone set 17 goes off-hook, however, the current drawn through the telephone set is sufficient to bias transistors Q6 and Q7 into their negative impedance region and, at this time, converter 14 combines with shunt negative impedance converter 13 to provide the required amplifier gain. Capacitor C3 blocks direct current flow around the loop while at the same time coupling autotransformer 15 to ring conductor 11 for voice frequencies. The turns ratio on autotransformer 15 of approximately 2:1 matches telephone set 17 to the impedance of the combined negative impedance amplifier and the telephone line from the central office. Since a reasonable impedance match is provided over a relatively large range of loop and section lengths, no adjustable impedance matching networks are required.

A parallel network of inductor L1 and resistor R13 is connected in series with tip conductor 10 to optimize the impedance match of the station repeater to the line. Voltage breakdown devices CR1 and CR2 provide lightning protection for the shunt negative impedance converter 13 and the series negative impedance converter 14, respectively.

The ringer in telephone set 17 can be operated to ground with a ringer isolator such as that shown in C. E. Jones et al U.S. Pat. No. 4,021,617, issued May 3, 1977, and assigned to applicant's assignee, or bridged by providing by-passing contacts in the tip lead around the station repeater.

Although not limited to the following values, the components of the drawing may have the following illustrative values.

R1 = 47 ohms
R2 = 100K ohms
R3 = 10K ohms
R4 = 220K ohms
R5 = 220K ohms
R6 = 10K ohms
R7 = 100K ohms
R8 = 680 ohms
R9 = 680 ohms
R10 = 47 ohms
R11 = 620 ohms
R12 = 47 ohms
C1 = 0.01 µfd
C2 = 0.01 µfd
C3 = 0.0015 µfd
C4 = 0.068 µfd
C5 = 1 µfd
Q1 = MPSA93
Q2 = Western Electric 66G
Q3 = Western Electric 66G
Q4 = Western Electric 51A
Q5 = Western Electric 51A
Q6 = Western Electric 51A
Q7 = Western Electric 66G
T1 = Western Electric 2587BT

What is claimed is:

1. A negative impedance bidirectional amplifier for insertion at the subscriber end of a telephone line, said amplifier comprising:
   a shunt negative impedance converter;
   a series negative impedance converter; and
   a shunt autotransformer;
   said negative impedance converters and said autotransformer being connected in a $\pi$ configuration with respect to said telephone line.

2. The negative impedance amplifier according to claim 1 further including:
   a current responsive switch responsive to currents in said telephone line for activating said shunt negative impedance converter.

3. The negative impedance amplifier according to claim 2 wherein said current responsive switch operates above a preselected current threshold to connect said shunt negative impedance converter across said telephone line.

4. The negative impedance amplifier according to claim 1 further including:
   a telephone set connected across the partial winding of said autotransformer.

5. The negative impedance amplifier according to claim 4 wherein said series negative impedance converter is biased to operate in a region of positive impedance when said telephone set is on-hook, and biased to operate in a region of negative impedance when said telephone set is off-hook.

6. A telephone station repeater energized from the central office battery over a long telephone loop, said repeater comprising:
   a shunt negative impedance converter,
   a current responsive switch for connecting said shunt negative impedance converter across said telephone loop;
   a series negative impedance converter connected to one end to said current responsive switch;
   an autotransformer connected at the other end of said series negative impedance converter and in shunt with said telephone loop; and
   at least one telephone set connected across a portion of the winding of said autotransformer.

7. The telephone station repeater according to claim 6 further including:
   a capacitor connected in series with said autotransformer.

8. The telephone station repeater according to claim 6 wherein said current responsive switch is disabled when said telephone set is on-hook and is enabled when said telephone set is off-hook.

9. The telephone station repeater according to claim 6 wherein said series negative impedance converter is biased in a region of positive impedance when said telephone set is on-hook, and is biased in a region of negative impedance when said telephone set is off-hook.

* * * * *